United States Patent
Suciu et al.

(10) Patent No.: US 11,073,087 B2
(45) Date of Patent: Jul. 27, 2021

(54) GAS TURBINE ENGINE VARIABLE PITCH FAN BLADE

(71) Applicant: United Technologies Corporation, Hartford, CT (US)

(72) Inventors: Gabriel L. Suciu, Glastonbury, CT (US); Brian D. Merry, Andover, CT (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 1404 days.

(21) Appl. No.: 14/187,612

(22) Filed: Feb. 24, 2014

(65) Prior Publication Data

US 2015/0125259 A1  May 7, 2015

Related U.S. Application Data

(60) Provisional application No. 61/769,836, filed on Feb. 27, 2013.

(51) Int. Cl.
| | |
|---|---|
| *F01D 7/02* | (2006.01) |
| *F02C 7/36* | (2006.01) |
| *F02K 3/06* | (2006.01) |
| *F01D 7/00* | (2006.01) |

(52) U.S. Cl.
CPC ............. *F02C 7/36* (2013.01); *F01D 7/00* (2013.01); *F02K 3/06* (2013.01); *Y02T 50/60* (2013.01)

(58) Field of Classification Search
CPC ............... F02C 7/36; F01D 5/026; F02K 3/06
See application file for complete search history.

(56) References Cited

U.S. PATENT DOCUMENTS

| | | | |
|---|---|---|---|
| 2,314,025 A | 3/1943 | Waseige | |
| 3,601,499 A | 8/1971 | Ellinger et al. | |
| 3,900,274 A * | 8/1975 | Johnston | F01D 7/00 |
| | | | 415/141 |
| 3,922,852 A | 12/1975 | Drabek | |
| 3,994,128 A | 11/1976 | Griswold, Jr. et al. | |
| 4,047,842 A | 9/1977 | Avena et al. | |
| 4,112,677 A * | 9/1978 | Kasmarik | F02K 3/06 |
| | | | 239/265.37 |
| 4,810,164 A * | 3/1989 | Wright | F04D 29/362 |
| | | | 415/129 |
| 4,968,217 A | 11/1990 | Newton | |
| 5,205,712 A | 4/1993 | Hamilton | |
| 5,242,265 A | 9/1993 | Hora et al. | |
| 5,282,719 A | 2/1994 | McCarty et al. | |
| 6,158,210 A * | 12/2000 | Orlando | F02C 3/067 |
| | | | 29/889.2 |
| 6,991,426 B2 | 1/2006 | Pietricola | |
| 2009/0252600 A1 * | 10/2009 | Winter | F01D 17/141 |
| | | | 415/145 |

* cited by examiner

*Primary Examiner* — David Hamaoui
*Assistant Examiner* — Brian O Peters
(74) *Attorney, Agent, or Firm* — Carlson, Gaskey & Olds, P.C.

(57) ABSTRACT

A gas turbine engine according to an exemplary aspect of the present disclosure includes, among other things, a fan section including a fan rotatable about an engine axis with a plurality of fan blades rotatable about a fan blade axis. A geared architecture is in communication with the fan and driven by a turbine section. The fan rotates at a first speed and the turbine section rotates at a second speed different from the first speed and a fixed area fan nozzle in communication with the fan section.

16 Claims, 3 Drawing Sheets

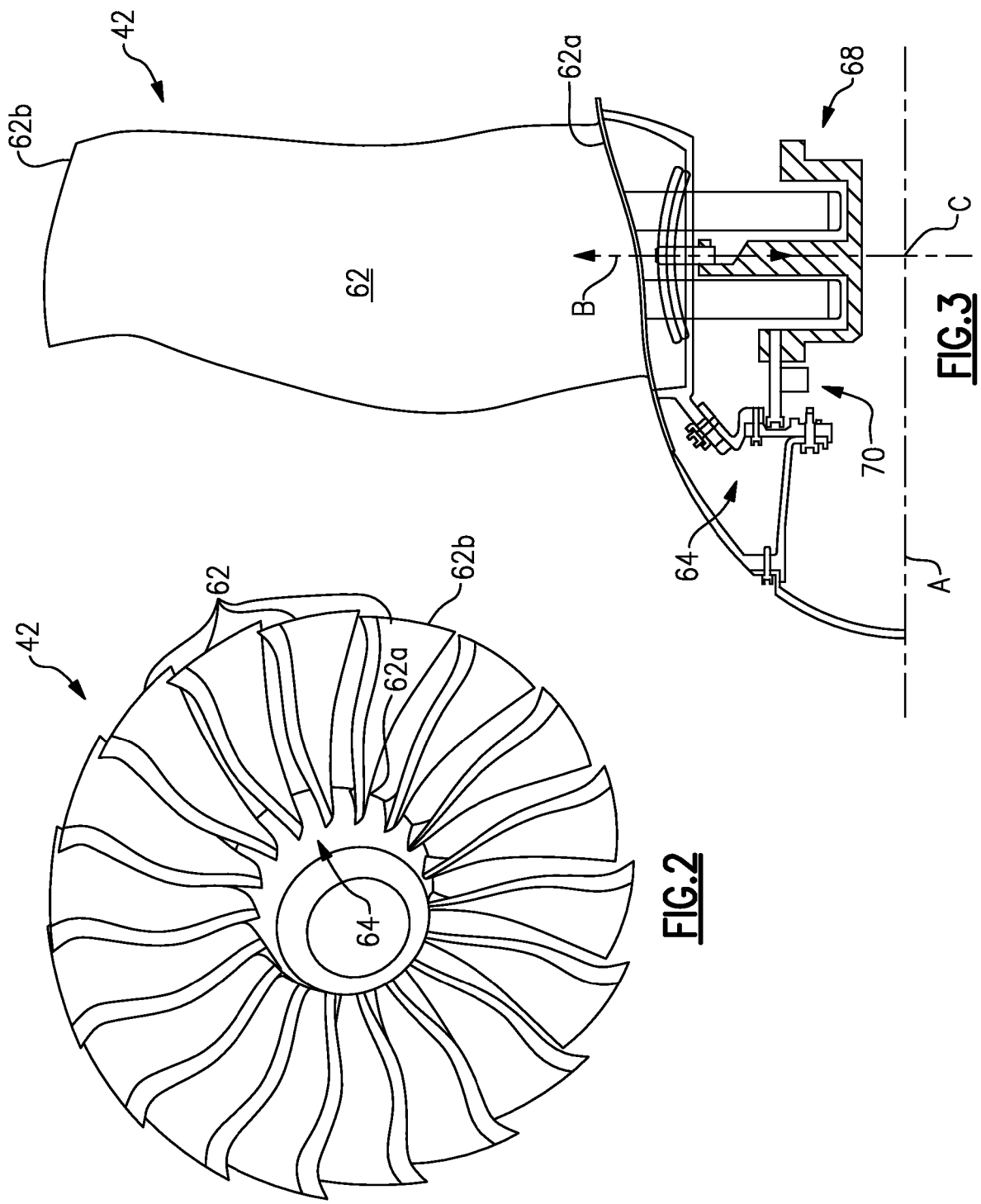

GAS TURBINE ENGINE VARIABLE PITCH FAN BLADE

CROSS REFERENCE TO RELATED APPLICATIONS

This application claims priority to U.S. Provisional Patent Application No. 61/769,836 filed Feb. 27, 2013.

BACKGROUND

This disclosure relates to a gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The fan section includes multiple airfoils disposed circumferentially about an engine longitudinal centerline axis. At certain aircraft operating conditions, these airfoils may experience self-induced oscillations, such as flutter. These self-induced oscillations may become severe enough to fracture the airfoil. One means of preventing such a fracture is to increase the chord width of the fan blades. However, this approach increases the overall weight of the engine and the rotating mass. Accordingly, it is desirable to develop an improved gas turbine engine design that will reduce flutter of the airfoils and decrease the weight of the engine.

SUMMARY

A gas turbine engine according to an exemplary aspect of the present disclosure includes, among other things, a fan section including a fan rotatable about an engine axis with a plurality of fan blades rotatable about a fan blade axis. A geared architecture is in communication with the fan and driven by a turbine section. The fan rotates at a first speed and the turbine section rotates at a second speed different from the first speed and a fixed area fan nozzle in communication with the fan section.

In a further non-limiting embodiment of the foregoing gas turbine engine, a fan section includes a fan rotatable about an engine axis with a plurality of fan blades rotatable about a fan blade axis and a speed change device in communication with the fan.

In a further non-limiting embodiment of either of the foregoing gas turbine engines, the speed change device includes a geared architecture driven by a turbine section for rotating the fan about the engine axis.

In a further non-limiting embodiment of any of the foregoing gas turbine engines, the gas turbine engine includes a low pressure turbine section with at least three sections.

In a further non-limiting embodiment of any of the foregoing gas turbine engines, the low pressure turbine section includes no more than six sections.

In a further non-limiting embodiment of any of the foregoing gas turbine engines, a fixed area fan nozzle is in communication with the fan section.

In a further non-limiting embodiment of any of the foregoing gas turbine engines, the engine axis is substantially perpendicular to the fan blade axis.

In a further non-limiting embodiment of any of the foregoing gas turbine engines, the fan blade axis of each of the plurality of fan blades intersects the engine axis at substantially an intersection point C.

In a further non-limiting embodiment of any of the foregoing gas turbine engines, each of the plurality of fan blades are rotatably attached to a central disk.

In a further non-limiting embodiment of any of the foregoing gas turbine engines, a radially inner end of each of the plurality of fan blades are attached to a rotatable mount on to the central disk.

In a further non-limiting embodiment of any of the foregoing gas turbine engines, the central disk includes an actuator mechanically attached to the rotatable mount for rotating each of the plurality of fan blades.

A method of operating a gas turbine engine according to another exemplary aspect of the present disclosure includes, among other things, the steps of rotating a fan section including a plurality of fan blades at a first speed, rotating the plurality of fan blades about a fan blade axis to change a pitch of each of the fan blades and rotating a low pressure turbine section at a second speed, wherein the first speed is different from the second speed.

In a further non-limiting embodiment of the foregoing method, the engine axis is substantially perpendicular to the fan blade axis.

In a further non-limiting embodiment of either of the foregoing methods, the low pressure turbine section includes at least three section and no more than six sections.

In a further non-limiting embodiment of any of the foregoing methods, each of the plurality of fan blades are rotatable about a central disk.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 2 is a perspective view of a fan.

FIG. 3 is a partial cross-sectional view of the fan.

DETAILED DESCRIPTION

Figure 1:
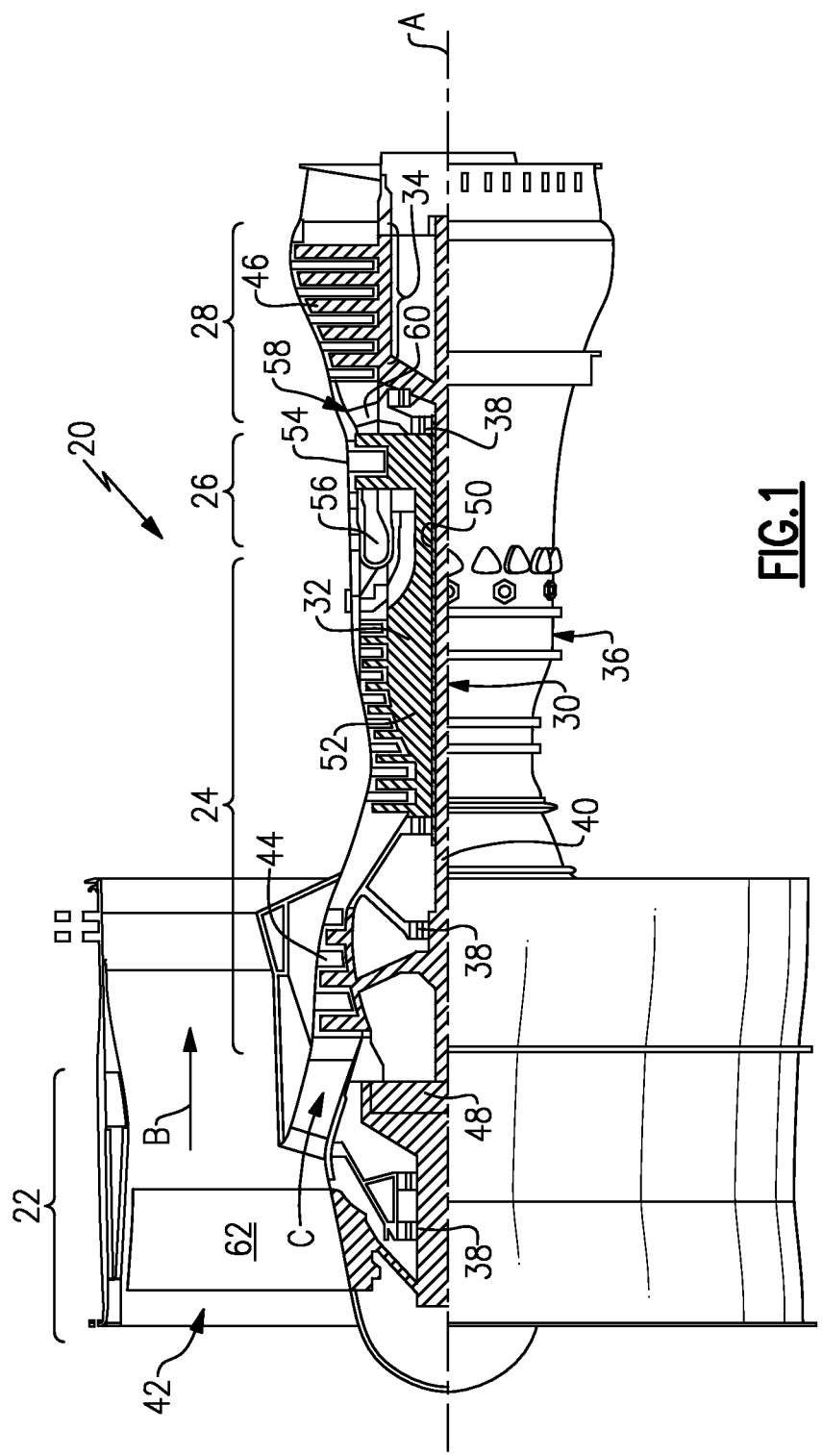
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle. In one non-limiting embodiment, the low pressure turbine 46 includes at least three stages and no more than 6 stages. In another non-limiting embodiment, the low pressure turbine 46 includes at least three stages and no more than 4 stages.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor section 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor section 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

FIG. 2 illustrates the example fan 42 with fan blades 62. Each of the fan blades 22 extend from a platform 62a on a radially inner end adjacent a central disk 64 to a fan tip 62b on a radially outer end. Due to the geared architecture 48, the fan 42 rotates at a slower speed than the low pressure turbine 46. Because the fan 42 has a lower rotational speed, the fan blade tip velocity decreases and the aerodynamic losses that would normally be associated with a fan are reduced. The gas turbine engine 20 is able to generate a similar amount of thrust as a gas turbine engine with a fan section that rotates at the same speed as the low pressure turbine by increasing the length and/or number of fan blades 62.

FIG. 3 illustrates a partial cross-sectional view of the fan 42. Each of the plurality of fan blades 62 are rotatably attached to the central disk 64 and rotatable about a fan blade axis B. Rotating each of the fan blades 62 about the fan blade axis B changes the pitch of the fan blades 62. By changing the pitch of the fan blades 62, the performance of the gas turbine engine 20 is able to be maximized over a wider range of operating conditions, such as during takeoff and cruise. In one non-limiting embodiment, the pitch of the fan blade 62 varies between zero and twenty degrees. In another non-limiting embodiment, the pitch of the fan blade 62 varies between zero and fifteen degrees.

The fan blade axis B is substantially perpendicular to the engine axis A. In one example, the fan blade axis B of each of the plurality of fan blades 62 intersects the engine axis A at substantially the same location marked by intersection point C. The platform 62a of the fan blade 62 is attached to a rotating mount 68 that allows the fan blade 62 to rotate around a fan blade axis B to vary the pitch of the fan blade 62. An actuator mechanism 70 is in mechanical communication with the rotating mount 68 to rotate the fan blade 62 to the appropriate pitch.

Figure 4:
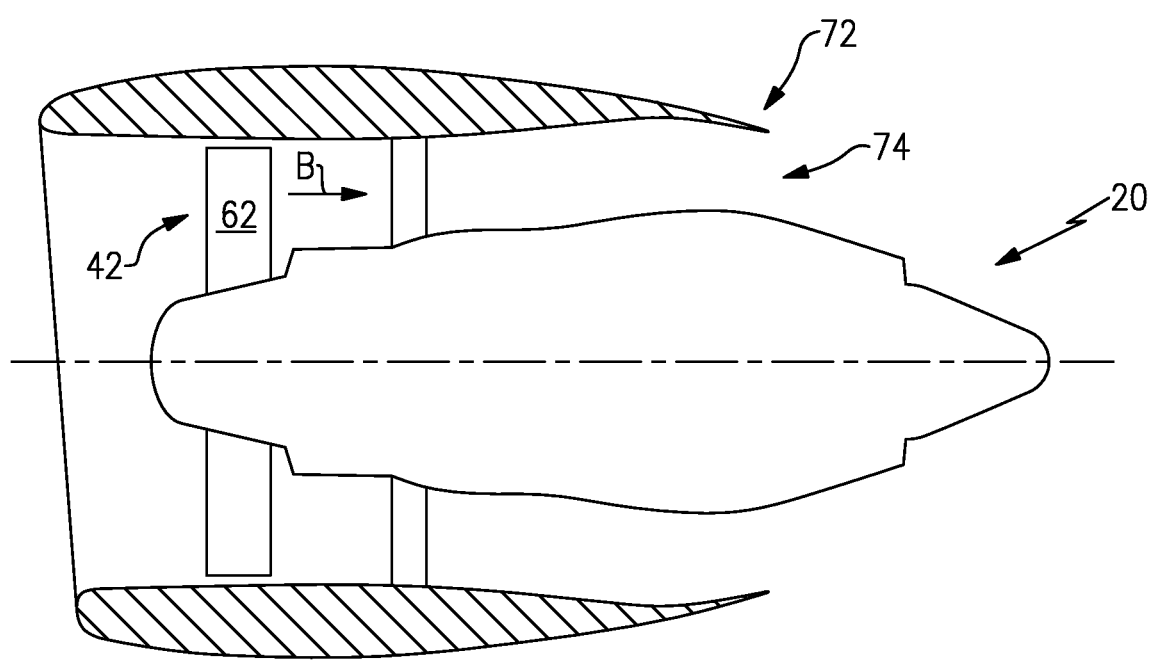
FIG. 4 is a partial cross-sectional view of a fixed area fan nozzle.

FIG. 4 illustrates an example fan nozzle 74. In one non-limiting embodiment, the fan nozzle 74 includes a fixed area fan nozzle 72 such that the exit area for the fan section 22 is fixed during operation of the gas turbine engine 20. Due to the increasing diameter of the fan of gas turbine engines with geared architecture, the weight associated with a variable area fan nozzle increases to accommodate the larger nozzle exit area. The resulting increase in size of variable area fan nozzles can diminish other engine weight saving approaches. Therefore, eliminating a variable area fan nozzle from the gas turbine engine 20 provides a significant weight saving over convention gas turbine engines with variable area fan nozzles. The variable area fan nozzle can be eliminated from the gas turbine engine 20 because of the gas turbine engine's 20 ability to prevent flutter of the fan blades 62 by varying the pitch.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
    a fan section including a fan rotatable about an engine axis with a plurality of fan blades rotatable about a fan blade axis, wherein at least a portion of each of the plurality of fan blades is radially aligned with a portion of a core flow path, each of the plurality of fan blades are rotatably attached to a central disk, a radially inner end of each of the plurality of fan blades are attached to a rotatable mount on to the central disk, and each of the plurality of fan blades rotate no more than 20 degrees;
    a geared architecture in communication with the fan and driven by a turbine section, wherein the fan rotates at a first speed and the turbine section rotates at a second speed different from the first speed; and
    a fixed area fan nozzle in communication with the fan section.

2. The gas turbine engine of claim 1, wherein each of the plurality of fan blades are attached to the central disk and the central disk is located entirely axially spaced upstream of the geared architecture.

3. The gas turbine engine of claim 1, wherein the plurality of fan blades are located fluidly upstream of the core flow path of the gas turbine engine.

4. A gas turbine engine comprising:
    a fan section including a fan rotatable about an engine axis with a plurality of fan blades rotatable about a fan blade axis, wherein the plurality of fan blades are located upstream of a core flow path of the gas turbine engine, each of the plurality of fan blades are rotatably attached to a central disk, a radially inner end of each of the plurality of fan blades are attached to a rotatable mount on to the central disk, and each of the plurality of fan blades rotate no more than 20 degrees.

5. The gas turbine engine of claim 4, wherein the geared architecture includes a geared architecture is driven by a turbine section and rotates the fan about the engine axis.

6. The gas turbine engine of claim 4, including a low pressure turbine section with at least three sections.

7. The gas turbine engine of claim 6, wherein the low pressure turbine section includes no more than six sections.

8. The gas turbine engine of claim 4, including a fixed area fan nozzle in communication with the fan section.

9. The gas turbine engine of claim 4, wherein the engine axis is substantially perpendicular to the fan blade axis.

10. The gas turbine engine of claim 4, wherein the fan blade axis of each of the plurality of fan blades intersects the engine axis at substantially an intersection point C.

11. The gas turbine engine of claim 4, wherein the central disk is located entirely axially upstream of the geared architecture.

12. The gas turbine engine of claim 4, wherein at least a portion of each of the plurality of fan blades is radially aligned with a portion of the core flow path.

13. A method of operating a gas turbine engine comprising the steps of:
    rotating a fan section including a plurality of fan blades at a first speed, wherein the plurality of fan blades direct air into a core flow path of the gas turbine engine;
    rotating the plurality of fan blades about a fan blade axis no more than 20 degrees to change each of the fan blades from a common first pitch to a common second pitch; and
    rotating a low pressure turbine section at a second speed, wherein the first speed is different from the second speed, wherein the fan section includes a fan rotatable about an engine axis with the plurality of fan blades rotatable about the fan blade axis, at least a portion of each of the plurality of fan blades is radially aligned with a portion of a core flow path, each of the plurality of fan blades are rotatably attached to a central disk, a radially inner end of each of the plurality of fan blades are attached to a rotatable mount on to the central disk.

14. The method of claim 13, wherein an axis of rotation of the gas turbine engine is substantially perpendicular to the fan blade axis.

15. The method of claim 13, wherein the low pressure turbine section includes at least three section and no more than six sections.

16. The method of claim 13, wherein the plurality of fan blades are located fluidly upstream of the core flow path and a portion of the air being directed into the core flow path travels over a platform of each of the plurality of fan blades.

* * * * *